United States Patent
Baur et al.

(10) Patent No.: US 12,230,856 B2
(45) Date of Patent: Feb. 18, 2025

(54) WAVEGUIDE DEVICE AND ANTENNA

(71) Applicant: VEGA Grieshaber KG, Wolfach (DE)

(72) Inventors: Roland Baur, Koenigsfeld (DE);
Steffen Wälde, Niedereschach (DE)

(73) Assignee: VEGA Grieshaber KG, Wolfach (DE)

( * ) Notice: Subject to any disclaimer, the term of this patent is extended or adjusted under 35 U.S.C. 154(b) by 802 days.

(21) Appl. No.: 17/072,826

(22) Filed: Oct. 16, 2020

(65) Prior Publication Data
US 2021/0126334 A1    Apr. 29, 2021

(30) Foreign Application Priority Data
Oct. 24, 2019   (EP) .................................... 19205063

(51) Int. Cl.
*H01P 3/12* (2006.01)
*G01S 7/03* (2006.01)
*G01S 13/88* (2006.01)
*H01P 1/02* (2006.01)

(52) U.S. Cl.
CPC .............. *H01P 3/122* (2013.01); *G01S 7/032* (2013.01); *G01S 13/885* (2013.01); *H01P 1/022* (2013.01)

(58) Field of Classification Search
CPC ... H04B 3/00; H04B 3/02; H04B 3/50; H04B 3/52; H04B 3/54; H01P 3/00; H01P 3/12; H01P 3/127; H01P 3/13; H01P 3/16
See application file for complete search history.

(56) References Cited

U.S. PATENT DOCUMENTS

| | | | |
|---|---|---|---|
| 2,758,287 A | 8/1956 | Bent et al. | |
| 2,853,684 A * | 9/1958 | Carter | ........................ H01P 5/08 333/13 |
| 3,369,197 A | 2/1968 | Giger et al. | |
| 6,489,855 B1 | 12/2002 | Kitamori et al. | |
| 6,867,660 B2 | 3/2005 | Kitamori et al. | |
| 9,571,823 B2 | 2/2017 | Spillmann et al. | |

(Continued)

FOREIGN PATENT DOCUMENTS

| CN | 102931491 A | 2/2013 |
|---|---|---|
| CN | 108711665 A | 10/2018 |

(Continued)

OTHER PUBLICATIONS

European Search Report issued in European Application No. 19205063.1, dated Apr. 3, 2020, 9 pages.

(Continued)

*Primary Examiner* — Diana J. Cheng
(74) *Attorney, Agent, or Firm* — Sterne, Kessler, Goldstein & Fox P.L.L.C.

(57) ABSTRACT

The invention relates to a waveguide arrangement for guiding electromagnetic waves, which comprises a rectangular waveguide and a circular waveguide. The rectangular waveguide merges into the circular waveguide at an angle. The circular waveguide is filled with a dielectric which projects into the rectangular waveguide in a transition section. The dielectric filling is beveled at a defined angle in the transition section so that a transition surface is formed by the inner edge at the transition of the waveguide arrangement and the end face of the rectangular waveguide at the transition. The dielectric filling is preferably flush with the closing wall of the rectangular waveguide.

18 Claims, 5 Drawing Sheets

(56) References Cited

U.S. PATENT DOCUMENTS

| | | | |
|---|---|---|---|
| 9,571,923 B2* | 2/2017 | Spillmann | H04R 1/2803 |
| 10,493,204 B2* | 12/2019 | Almoumen | A61M 5/3137 |
| 10,760,940 B2 | 9/2020 | Waelde et al. | |
| 10,833,386 B2* | 11/2020 | Kitt | H01P 5/024 |
| 2002/0030632 A1 | 3/2002 | Popa et al. | |
| 2008/0068112 A1 | 3/2008 | Yu et al. | |
| 2018/0287264 A1 | 10/2018 | Walde et al. | |
| 2018/0372531 A1 | 12/2018 | Waelde | |
| 2019/0150134 A1 | 5/2019 | Kakinada et al. | |
| 2019/0312327 A1 | 10/2019 | Kitt | |

FOREIGN PATENT DOCUMENTS

| | | |
|---|---|---|
| CN | 109559958 A | 4/2019 |
| DE | 1491921 A1 | 1/1970 |
| EP | 0669673 A1 | 8/1995 |
| EP | 1014470 A2 | 6/2000 |
| EP | 3309897 A1 | 4/2018 |
| EP | 3309899 A1 | 4/2018 |
| EP | 3311450 A1 | 4/2018 |
| GB | 765645 A | 1/1957 |
| JP | H0529801 A | 2/1993 |
| JP | H0555808 A | 3/1993 |
| JP | H05206720 A | 8/1993 |
| JP | H05235603 A | 9/1993 |
| JP | H07263905 A | 10/1995 |
| JP | H07321540 A | 12/1995 |
| JP | H09107225 A | 4/1997 |
| JP | 2004120792 A | 4/2004 |
| WO | 2016202394 A1 | 12/2016 |

OTHER PUBLICATIONS

Kouki et al., Miniature Ceramic Horn Antenna for a High Data Rates Wireless Communications Systems at 60GHz. Antenna Technology and Applied Electromagnetics (ANTEM). 2012 15 International Symposium on, IEEEE. Jun. 25, 2012. Seiren 12-4, XP032219677 (Abstract).

The China National Intellectual Property Administration, "Waveguide Device and Antenna", Appl. No. 202011096455.X, dated Aug. 14, 2024, 6 pages.

\* cited by examiner

WAVEGUIDE DEVICE AND ANTENNA

CROSS-REFERENCE TO RELATED APPLICATIONS

This application claims the benefit of the filing date of European Patent Application No. 19 205 063.1 filed on Oct. 24, 2019, the entire content of which is incorporated herein by reference.

FIELD

The invention relates to a waveguide arrangement for guiding electromagnetic waves and an antenna for a 3D radar for detecting bulk material topologies comprising such a waveguide arrangement.

BACKGROUND

Electromagnetic waves in the GHz range are usually decoupled from the board via coaxial connectors or directly via a coupling pin into a rectangular waveguide. The connection between the IC and the waveguide is made by means of a stripline on a quartz substrate, which has a patch that excites the waveguide on one side and is connected to the IC on the other side by means of a bond wire connection. Alternatively, the patch that excites the waveguide is integrated directly onto the IC, so no bond wire connection is required. The open waveguide end of a radar or communication module manufactured with this technology can be operated with the attachment of a horn antenna. However, a rotationally symmetrical antenna is fed by a circular waveguide, so that a transition from the rectangular waveguide to the circular waveguide is necessary. The transition causes insertion and attenuation losses.

The transition from an unfilled rectangular waveguide to a circular waveguide filled with dielectric at a 90° angle requires a suitable coupling.

BRIEF SUMMARY

The objective of the invention is to create an effective transition from a rectangular waveguide to a circular waveguide.

The objective is solved by the subject-matter of the independent claims. Advantageous embodiments are the subject of the dependent claims, the following description and the figures.

According to a first aspect, a waveguide arrangement for conducting electromagnetic waves is provided, which comprises a rectangular waveguide and a circular waveguide. The rectangular waveguide merges into the circular waveguide at an angle, e.g. a 90° angle. The circular waveguide is filled with a dielectric which projects into the rectangular waveguide in a transition section. The dielectric filling is beveled in the transition section at a defined angle so that a transition surface is formed which is included by the defined angle relative to the surface of the circular waveguide opening and divides the angle, e.g., a 90° angle, of the transition from the rectangular waveguide to the circular waveguide.

The electromagnetic, high-frequency wave is thus guided from the feed point via the rectangular waveguide to the circular waveguide and, before entering the circular waveguide, hits a beveled surface of the dielectric material with which the circular waveguide is filled and which projects from it into the rectangular waveguide with this bevel. Reflections are reduced by the bevel. This ensures a low-loss, i.e., low-reflection and low-attenuation transition. This in turn avoids or at least reduces so-called pseudo echoes in the radar signal, which occur at the surface of the transition and can falsify the measurement.

By using a dielectric filling, the arrangement becomes space-saving, as the width of the overall arrangement can be smaller than half the wavelength of the maximum working frequency range, as would be the case without a dielectric filling material, i.e., based on air.

According to a further embodiment, the bevel angle of the bevel is preferably between 20° and 40°. In this range, there are advantageous values regarding insertion loss and matching. A very good result was achieved, for example, with an angle for the bevel of 36°. The beveled end of the dielectric filling protrudes into the rectangular waveguide by 40.4%. If the circular waveguide is at an angle other than 90° to the rectangular waveguide, other angles of the bevel may be optimal.

According to an embodiment, the dielectric filling comprises a lens at the free end of the circular waveguide. The lens protrudes at least partially from the circular waveguide on the side of the dielectric filling facing the free space and allows the electromagnetic wave to emerge from the waveguide and be radiated with low reflection.

According to a further embodiment, the lens has a small shoulder or projection on the side facing the circular waveguide, with which it rests on the end of the circular waveguide or on which it stands. This defines an exact penetration depth into the rectangular waveguide.

According to a further embodiment, the dielectric filling has an extension along the front side of the rectangular waveguide to define the exact penetration depth, so that the dielectric filling in the mounted state stands or abuts on the side opposite the opening at the transition. As the dielectric filling, e.g., the polyetheretherketone material, is only extended along the front side, i.e., is not continued in its entire width or with its entire circumference, a sufficiently large free, beveled surface remains which can accommodate the waveguide wave and guide it into the circular waveguide without significantly damping the insertion loss. This design can be used, for example, if the dielectric filling has no lens, or if the lens has no circumferential shoulder. Furthermore, both variants are also possible simultaneously.

According to a further embodiment, the circular waveguide is located on the narrow side of the rectangular waveguide. The rectangular waveguide is thus contacted in the H-plane of electromagnetic wave propagation by the circular waveguide, so that the signal is coupled into the circular waveguide via the H-plane, i.e., via the narrow or flat side of the rectangular waveguide. If a waveguide array is used for an antenna array with several waveguide arrangements, the width of the narrow side of the rectangular waveguide is decisive for the width of the individual waveguide arrangements, as explained and illustrated again below using the drawings. This design represents a further measure to save space in the waveguide array and thus also in an antenna array. Although it is technically possible to contact the rectangular waveguide in the E-plane of electromagnetic wave propagation through the circular waveguide, the coupling of the signal through the wide side of the rectangular waveguide makes the arrangement wider.

The relative permittivity of the dielectric filling is between 2 and 15, according to another embodiment, and these values have proved to be particularly advantageous in terms of wave propagation and the wavelength of the working spectrum in relation to the dimensions of the waveguide. The dielectric filling can also have an inhomogeneous permittivity.

According to a further embodiment, the dielectric filling consists of the material polyetheretherketone (PEEK), which, due to its melting temperature of about 335°, can also be used at high temperatures up to about 250° C. and thus allows the electromagnetic waves to be conducted with low loss.

According to a further embodiment, the dielectric filling is made of the material polytetrafluoroethylene (PTFE), which also has a high melting temperature and even lower losses when conducting the electromagnetic wave. Due to its high expansion at high temperatures, it is necessary to consider which plastic is the most suitable for each application. A combination of PEEK and PTFE can also be used.

According to a further embodiment, the width of the overall arrangement is less than half the wavelength of the maximum working frequency range of the arrangement. This is made possible, as already explained above, by the dielectric filling as well as the contacting in the H-plane, i.e., the narrow side of the rectangular waveguide.

According to a second aspect, an antenna for a 3D-radar device for the detection of bulk material topologies is provided. The antenna has a waveguide arrangement as described above. In particular, the antenna can be an array antenna with columns and rows, where an array element corresponds to a waveguide arrangement. One parameter for the size of the array in the mechanical design is the width of the waveguide array. Because the waveguide array is narrow due to the H-plane coupling and the dielectric filling, the array elements, i.e., the waveguide arrangements, can be closer together.

Another aspect relates to the use of a waveguide arrangement described above and below in a radar measuring device, in particular in a 3D radar, or a level radar measuring device.

BRIEF DESCRIPTION OF THE DRAWINGS

In the following, examples of the invention are described in detail with reference to the enclosed figures. Neither the description nor the figures shall be interpreted as restricting the invention. These figures show.

The drawings are only schematic and not to scale. In principle, identical or similar parts are marked with the same reference marks.

DETAILED DESCRIPTION

Figure 1:
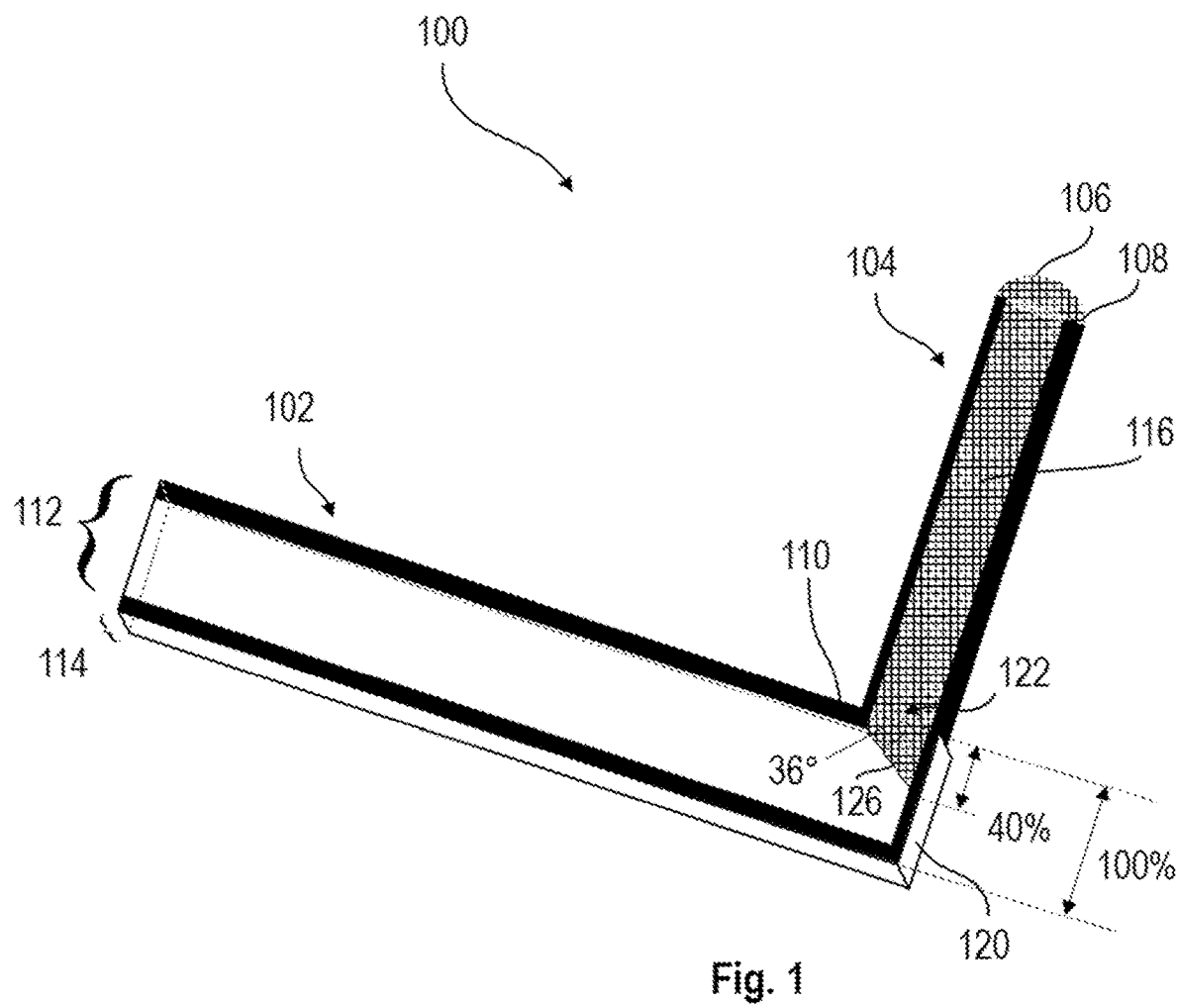
FIG. 1 a waveguide arrangement with a rectangular waveguide and a circular waveguide according to an embodiment.

FIG. 1 shows a waveguide arrangement 100 with a rectangular waveguide 102 and a circular waveguide 104 according to an embodiment. The rectangular waveguide 102 stands at its one end on one of the narrow sides 114 of the rectangular waveguide 102 at right angles to the circular waveguide 104. The transition 110 is flush here. The circular waveguide 104 has a dielectric filling 116 and merges flush with the rectangular waveguide 102 at the edge 110, with part of the dielectric filling 116 projecting into the rectangular waveguide 102. The angle formed between the surface of the round conductor opening 122 and the surface 126 of the bevel of dielectric filling 116 is advantageously e.g., 36°, so that the dielectric filling 116 projects into the rectangular waveguide 102 about 40% in relation to the wide side 112 of the rectangular waveguide 102.

At the output of the circular waveguide 104, a lens 106 ensures that a transition from the filled circular waveguide 104 to the free space is as low-reflection as possible. The lens 106 has a rim 108, which is supported on the end of the circular waveguide 104 and thus defines an exact penetration depth of the dielectric filling 116 into the rectangular waveguide 102.

Figure 2:
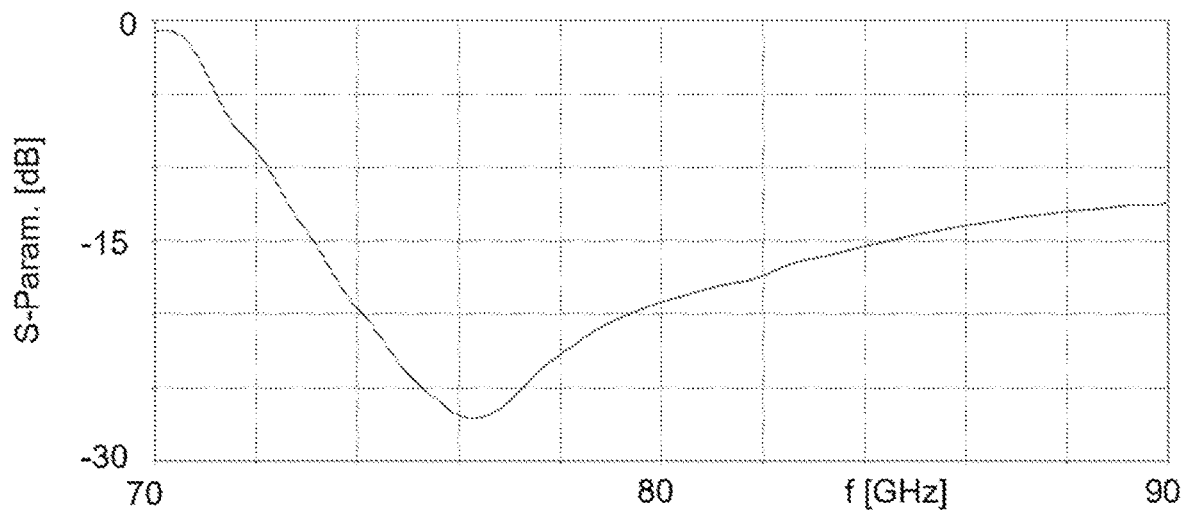
FIG. 2 a diagram of the waveguide configuration adjustment.

FIG. 2 shows a diagram of the adaptation of the transition from the rectangular waveguide 102 to the circular waveguide 104, i.e., how much energy of the electromagnetic wave is reflected back from the described arrangement 100 of rectangular waveguide 102 and circular waveguide 104. As can be seen in FIG. 2, this is less than −15 dB in the range between 73 GHz and 85 GHz with a minimum of −27 dB at 76 GHz.

Figure 3:
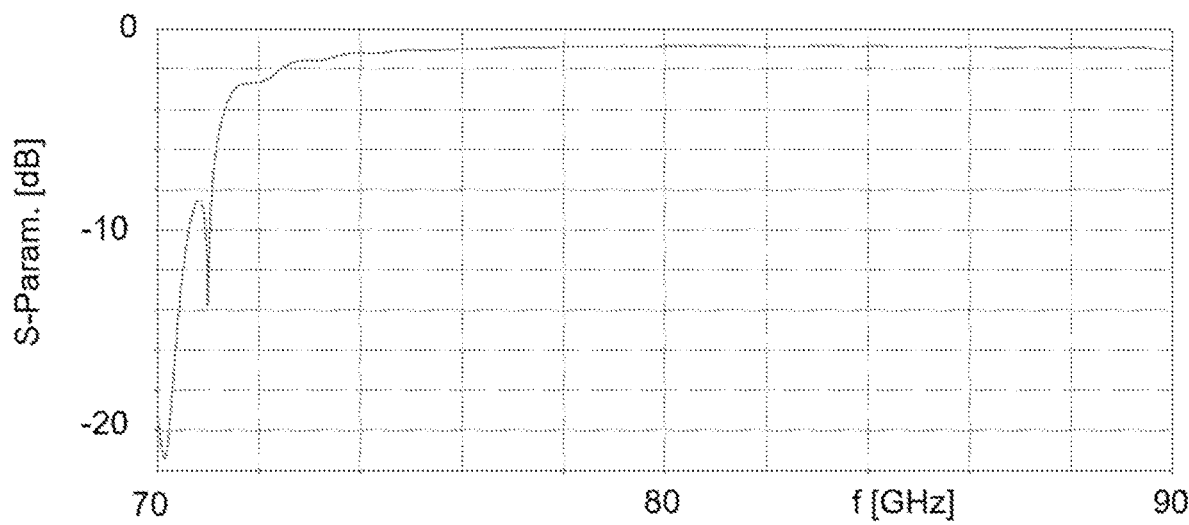
FIG. 3 a diagram of the insertion loss of the waveguide array.

FIG. 3 shows a diagram of the insertion loss of arrangement 100, which is 3 dB at approx. 71.5 GHz and only approx. 1 dB at 74 GHz and above.

FIGS. 2 and 3 thus show the advantage of the presented waveguide arrangement 100 with respect to the electrical properties. The following two drawings show the advantage in terms of the form factor.

Figure 4:
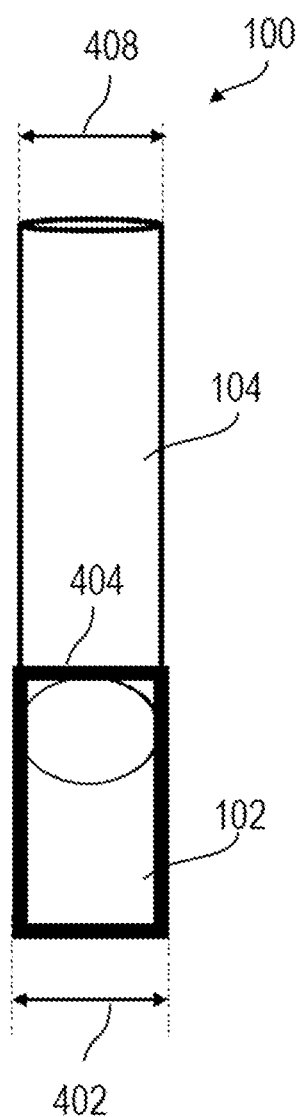
FIG. 4 a top view of the waveguide arrangement according to an embodiment.

FIG. 4 shows a top view of the arrangement 100 according to an embodiment, from which the width 402 of the overall arrangement 100 of the rectangular waveguide 102 and the circular waveguide 104 can be seen. It can be seen that the width 408 of the circular waveguide 104 is about as large as the narrow side 404 of the rectangular waveguide 102, which allows several such waveguide arrangements 100 to be placed close together, as shown in FIG. 5.

Figure 5:
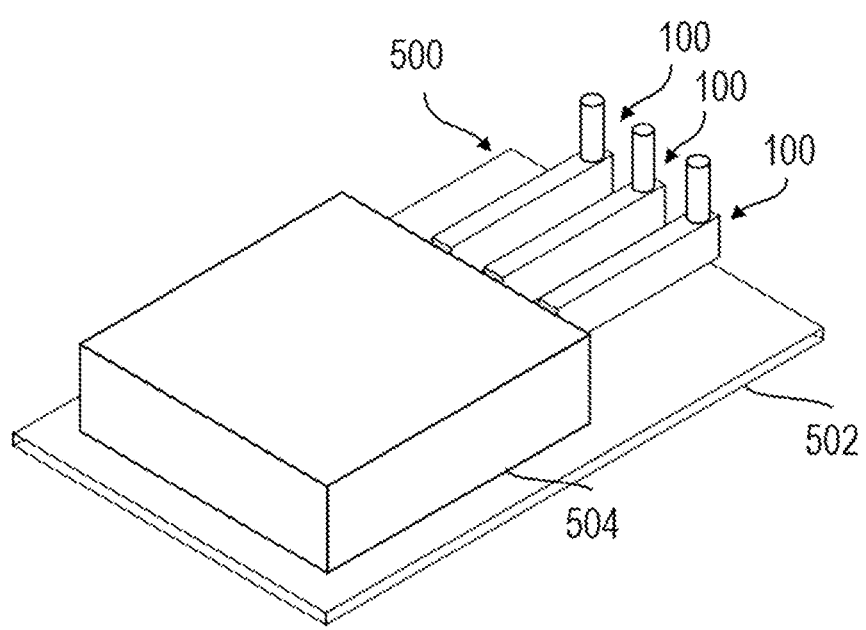
FIG. 5 an exemplary setup of several of the waveguide arrangements according to an embodiment.

FIG. 5 shows an example of the principle structure of an antenna 500 or an antenna array 500 on a circuit board 502, in which several waveguide arrangements 100 are arranged side by side in an array, and where the advantage of the waveguide array with respect to the dimensions is visible in the width of an antenna array 500.

For example, the connection of an IC or a circuit, e.g. in a package 504, is made with one of the waveguides 100. The rectangular waveguide 102 picks up the wave, which then penetrates through it into the circular waveguide 104 and is radiated by it.

While FIG. 5 shows only three one-dimensionally arranged elements for the sake of clarity, a real array can have far more waveguide arrangements 100, or elements 100 in two dimensions, whereby the elements can also be arranged offset, can have different lengths and can be packed more densely than shown in FIG. 5.

Figure 6:
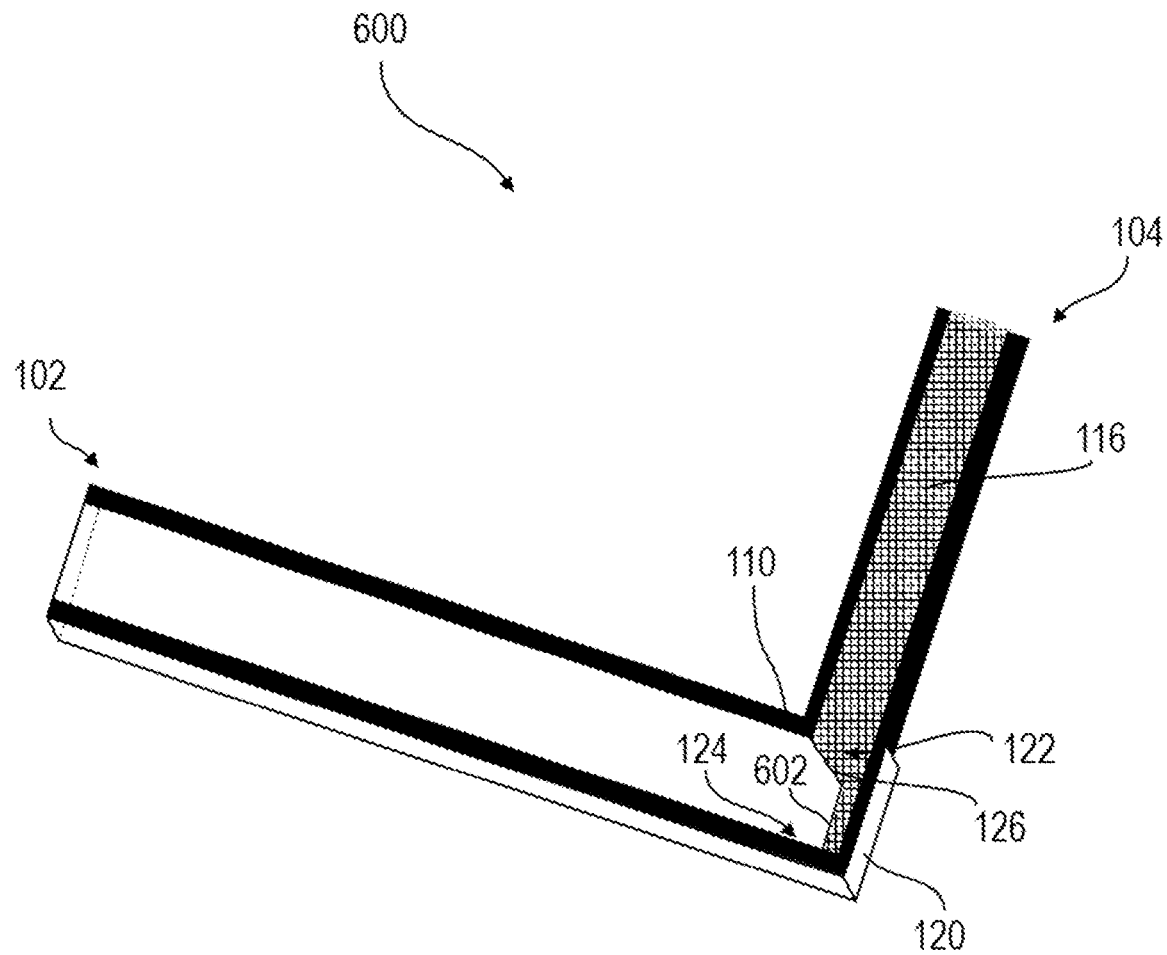
FIG. 6 a waveguide arrangement with a rectangular waveguide and a circular waveguide according to an embodiment.

FIG. 6 shows a waveguide arrangement 100 with a rectangular waveguide 102 and a circular waveguide 104 according to another embodiment. In this example, instead of the projecting edge 108 of a lens 106 (see FIG. 1), the penetration depth of the dielectric filling 116 is now determined by an extension 602 of the dielectric filling 116 along the front side 120 of the rectangular waveguide 102, so that the dielectric filling 116 in the mounted state stands on the side 124 of the rectangular waveguide 102, or abuts against it, which is opposite the opening 122 to the circular waveguide 104. Despite the extension 602, the beveled area surface 126 remains sufficiently large to accommodate the waveguide wave from the rectangular waveguide 102 without significant additional insertion loss.

The waveguide arrangement 100, 600 thus provides an effective transition from a rectangular waveguide 102 to a circular waveguide 104, which are at an angle to each other. Effective in this context means in particular, on the one hand, that a transition between the two waveguide types with the widest possible bandwidth and low attenuation for high-frequency signals is created, and, on the other hand, that a space-saving arrangement is created for feeding an antenna array 500.

This is achieved by a clever design of the end of the dielectric filling 116 which projects into the rectangular waveguide 102. This extends into the rectangular waveguide 102 to an advantageously chosen extent and is beveled at an advantageously chosen angle.

For the expert it is self-evident that other variations are also possible. For example, the rectangular waveguide 102 can be contacted in the E-plane by the circular waveguide 104. Although this also results in low insertion loss and good matching due to the beveled shape of the dielectric filling, in this case the contacting would have to take place on the wide side 112 of the rectangular waveguide 104, which significantly increases the overall width 402 of the arrangement and therefore space-saving arrays cannot be realized.

Furthermore, the dielectric filling 116 can also be realized, for example, without lens 106, which on the one hand allows a simpler and cheaper production, but on the other hand does not use the positive effect regarding the radiation properties of the electromagnetic wave compared to an arrangement with lens 106.

Furthermore, the angle between the rectangular waveguide and the circular waveguide may differ from 90°.

What is claimed is:

1. A waveguide arrangement for guiding electromagnetic waves, comprising:
    a rectangular waveguide; and
    a circular waveguide configured to output the electromagnetic waves to a free space through a free end,
    wherein the rectangular waveguide merges into the circular waveguide in a transition section at an angle of transition, the circular waveguide is filled with a dielectric filling, and the dielectric filling projects into the rectangular waveguide in the transition section.

2. The waveguide arrangement according to claim 1, wherein the dielectric filling in the transition section is beveled at a defined angle so as to form a transition surface which is included by the defined angle relative to the surface of a circular waveguide opening and divides the angle of transition from the rectangular waveguide to the circular waveguide.

3. The waveguide arrangement according to claim 2, wherein the angle of the bevel is preferably between 20° and 40°.

4. The waveguide arrangement according to claim 1, wherein the dielectric filling has a lens at the free end of the circular waveguide.

5. The waveguide arrangement according to claim 4, wherein the lens at the free end of the circular waveguide has a circumferential projection against which the dielectric filling stands when mounted.

6. The waveguide arrangement according to claim 2, wherein the dielectric filling has an extension along an end face of the rectangular waveguide so that the dielectric filling in an assembled state stands on a side opposite the circular waveguide opening at the transition section.

7. The waveguide arrangement according to claim 1, wherein the transition section being characterized in that the circular waveguide is located on a narrow side of the rectangular waveguide.

8. The waveguide arrangement according to claim 1, wherein a relative permittivity of the dielectric filling is between 2 and 15.

9. The waveguide arrangement according to claim 1, wherein the dielectric filling consists of the material polyetheretherketone (PEEK).

10. The waveguide arrangement according to claim 1, wherein the dielectric filling is made of the material polytetrafluoroethylene (PTFE).

11. The waveguide arrangement according to claim 1, wherein a width of the waveguide arrangement is less than half a wavelength of a maximum operating frequency range of the waveguide arrangement.

12. An antenna for a 3D radar for detecting bulk material topologies, comprising a waveguide arrangement according to claim 1.

13. Use of a waveguide arrangement according to claim 1 in a radar measuring device.

14. A waveguide arrangement for guiding electromagnetic waves, comprising:
    a rectangular waveguide; and
    a circular waveguide filled with a dielectric filling,
    wherein the rectangular waveguide merges into the circular waveguide at an angle of transition, and
    wherein the dielectric filling is beveled at a defined angle relative to the surface of an opening of the circular waveguide, the defined angle projecting into the rectangular waveguide and forming a transition surface dividing the angle of transition.

15. The waveguide arrangement according to claim 14, wherein the defined angle is between 20° and 40°.

16. The waveguide arrangement according to claim 14, wherein a width of the circular waveguide is approximately the same as a width of a narrow side of the rectangular waveguide.

17. The waveguide arrangement according to claim 14, wherein the dielectric filling has a lens at a free end of the circular waveguide.

18. The waveguide arrangement according to claim 17, wherein the lens at the free end of the circular waveguide has a circumferential projection against which the dielectric filling stands when mounted.

* * * * *